US011511381B2

(12) United States Patent
Ceckowski et al.

(10) Patent No.: US 11,511,381 B2
(45) Date of Patent: Nov. 29, 2022

(54) MOVEMENT CONTROL OF MATERIAL REMOVAL SYSTEMS

(71) Applicant: ILLINOIS TOOL WORKS INC., Glenview, IL (US)

(72) Inventors: Douglas A. Ceckowski, Gurnee, IL (US); Jeffrey Eric Joray, Lake Villa, IL (US); Michael Shtilman, Buffalo Grove, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 92 days.

(21) Appl. No.: 16/518,160

(22) Filed: Jul. 22, 2019

(65) Prior Publication Data

US 2020/0070294 A1  Mar. 5, 2020

Related U.S. Application Data

(60) Provisional application No. 62/724,140, filed on Aug. 29, 2018.

(51) Int. Cl.
| | |
|---|---|
| *B23D 55/08* | (2006.01) |
| *B23Q 15/12* | (2006.01) |
| *B23D 59/00* | (2006.01) |

(52) U.S. Cl.
CPC ............. *B23Q 15/12* (2013.01); *B23D 55/08* (2013.01); *B23D 59/002* (2013.01)

(58) Field of Classification Search
CPC ...... B23Q 15/12; B23D 55/08; B23D 59/002; B23D 59/006; B23D 45/003; G05B 19/404; B26D 7/26

(Continued)

(56) References Cited

U.S. PATENT DOCUMENTS 3,579,888 A * 5/1971 Kusakabe ................ B41J 29/15
                                                        40/356
3,597,888 A * 8/1971 Kusakabe ............... B24B 49/14
                                                        451/21

(Continued)

FOREIGN PATENT DOCUMENTS

| CN | 107741732 | 2/2018 |
| DE | 4222990 | 10/1993 |

(Continued)

OTHER PUBLICATIONS

Simsir, "Torque-Controlled Adaptive Speed Control on a CNC Marble Saw Machine," Advances in Mechanical Engineering, 2014, 8 pages.

(Continued)

*Primary Examiner* — Nhat Chieu Q Do
(74) *Attorney, Agent, or Firm* — McAndrews, Held & Malloy, Ltd.

(57) ABSTRACT

A material removal system may control movement of a material removal machine based on whether a material removal tool is in contact with a sample. A material removal system may include a material removal machine (e.g., saw, grinder, polisher, and/or more general material preparation and/or testing machine) that is configured to move at the urging of one or more actuators. The system may further include control circuitry configured to control movement (and/or speed, acceleration, etc.) of the material removal machine (e.g., via the actuators) based on one or more power, thermal, position, and/or other parameters that indicate whether the material removal tool of the material removal machine is in contact with a sample.

19 Claims, 11 Drawing Sheets

(58) Field of Classification Search
USPC .............. 83/56, 72, 76, 206, 207, 440, 466
See application file for complete search history.

(56) References Cited

U.S. PATENT DOCUMENTS

| | | | | |
|---|---|---|---|---|
| 3,952,458 | A | * | 4/1976 | Tomita ................ B23Q 15/225 451/11 |
| 3,991,644 | A | | 11/1976 | Sugimoto |
| 4,625,603 | A | | 12/1986 | Vanden Brink |
| 4,662,122 | A | * | 5/1987 | Ohmura ................ B24B 47/22 451/11 |
| 4,901,612 | A | | 2/1990 | Harris |
| 5,315,789 | A | * | 5/1994 | Takashi ................ G05B 19/404 451/5 |
| 5,796,229 | A | | 8/1998 | Akeel |
| 5,874,678 | A | | 2/1999 | Yamamoto |
| 6,237,585 | B1 | | 5/2001 | Oishi et al. |
| 6,382,062 | B1 | | 5/2002 | Smith |
| 8,489,223 | B2 | | 7/2013 | Gass |
| 8,844,414 | B2 | * | 9/2014 | Georgi ................ B23D 59/001 83/56 |
| 9,314,859 | B2 | | 4/2016 | Matsunaga et al. |
| 2003/0097917 | A1 | | 5/2003 | Virvalo et al. |
| 2004/0163373 | A1 | | 8/2004 | Adams et al. |
| 2006/0074512 | A1 | | 4/2006 | Minalga et al. |
| 2011/0232443 | A1 | | 9/2011 | Kojima et al. |
| 2015/0158097 | A1 | | 6/2015 | Myrfield |
| 2015/0217472 | A1 | * | 8/2015 | Adair ................ B26D 1/12 83/13 |
| 2016/0001410 | A1 | * | 1/2016 | Koyama ................ B23Q 15/12 700/170 |
| 2016/0273708 | A1 | * | 9/2016 | Voong ................ B23D 59/001 |
| 2016/0303669 | A1 | | 10/2016 | Harris |

FOREIGN PATENT DOCUMENTS

| | | |
|---|---|---|
| DE | 19622374 | 12/1997 |
| EP | 2476531 | 7/2012 |
| EP | 2572825 A2 | 3/2013 |
| WO | 2006067398 | 6/2006 |

OTHER PUBLICATIONS sawstop.com, "SawStop Saws Detect Contact with Skin," retrieved from www.sawstop.com/why-sawstop/the-technology/, retrieved on Jul. 22, 2019, 2 pages.

ATI Industrial Automation, "Robotic Collision Sensors," retrieved from https://www.ati-ia.com/products/collision_sensor/robot_collision_sensor.aspx, retrieved on Jun. 6, 2019, 1 page.

DoItYourself.com, "Why Change the Speed on Your Angle Grinder," retrieved from https://www.doityourself.com/stry/a-complete-guide-to-hacksaw-blade-types, retrieved on Jun. 6, 2019, 14 pages.

JJ Smith Woodworking Machinary, "Stromab Matrix Fast500 High Speed Automatic Cross Cutting Saw," published Nov. 18, 2014, retrieved from https://www.youtube.com/watch?v=o2O0YjyZNnE, retrieved on Jun. 6, 2019, 2 pages.

International Searching Authority, "International Search Report and Written Opinion," issued in connection with International Patent Application No. PCT/US2019/048511, dated Dec. 10, 2019, 16 pages.

* cited by examiner

MOVEMENT CONTROL OF MATERIAL REMOVAL SYSTEMS

CROSS REFERENCE TO RELATED APPLICATIONS

This application claims priority from, and the benefit of, U.S. Provisional Application Ser. No. 62/724,140, entitled "MOVEMENT CONTROL OF MATERIAL REMOVAL SYSTEMS," filed Aug. 29, 2018, the entirety of which is hereby incorporated by reference.

TECHNICAL FIELD

The present disclosure generally relates to material removal systems and, more particularly, to movement control of material removal systems.

BACKGROUND

Conventional material removal machines (e.g., saws, grinders, and/or polishers) are either stationary or configured to be moved and/or manipulated by human hands. Some more complex material removal machines are configured for movement via machine assemblies. However, movement control of the machine assemblies can be crude and/or imprecise.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to movement control of material removal systems, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
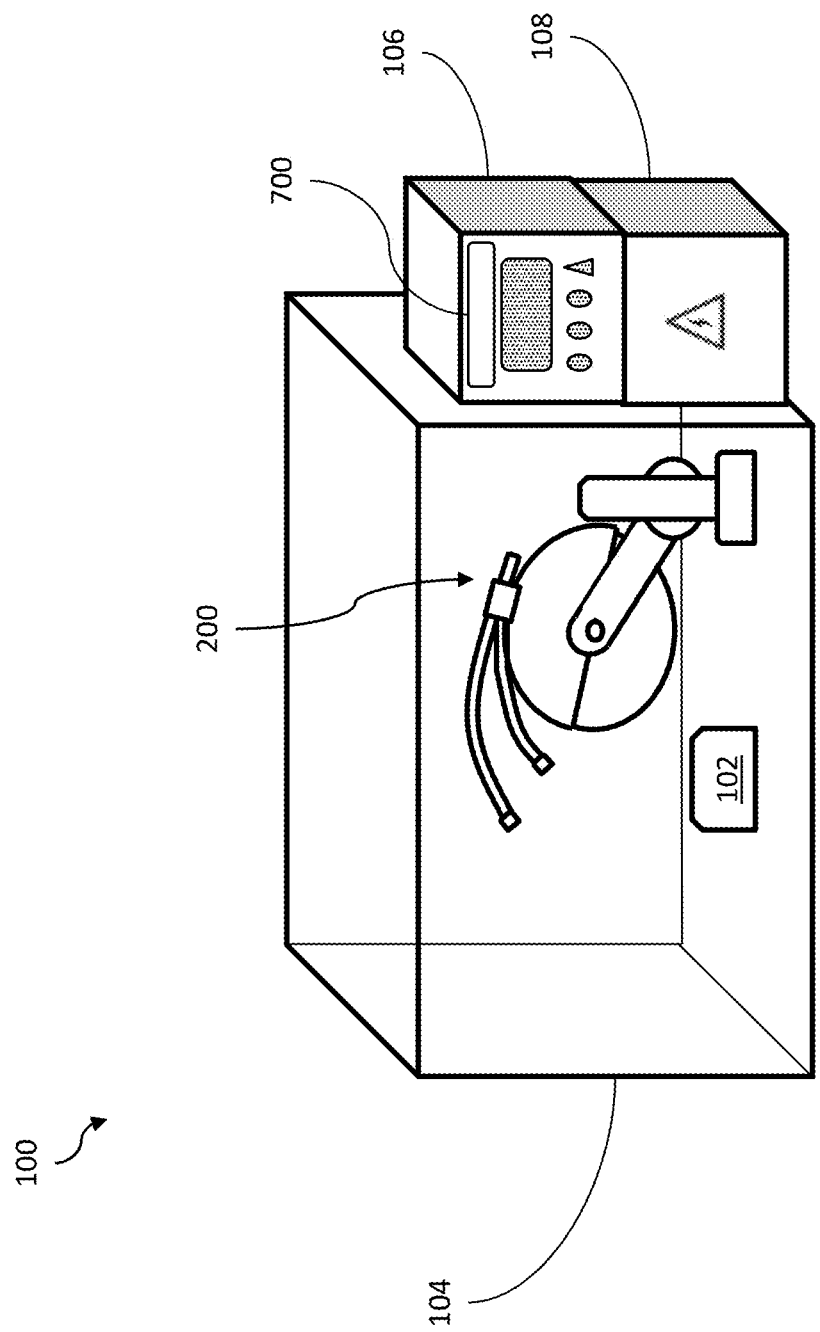
FIG. 1 is a perspective view of an example material removal system, in accordance with aspects of this disclosure.

The figures are not necessarily to scale. Where appropriate, the same or similar reference numerals are used in the figures to refer to similar or identical elements. For example, reference numerals utilizing lettering (e.g., upper support rail 202*a*, lower support rail 202*b*) refer to instances of the same reference numeral that does not have the lettering (e.g., support rails 202).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit and/or controller may include digital and/or analog circuitry, discrete and/or integrated circuitry, microprocessors, DSPs, etc., software, hardware and/or firmware, located on one or more boards, that form part or all of a controller, and/or are used to control a material removal assembly.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, electromagnetic field, current, voltage, and/or enthalpy. For example, measuring and/or controlling "power" may involve measuring and/or controlling energy, electromagnetic field, voltage, current, energy, and/or enthalpy.

Some examples of the present disclosure relate to a material removal system, comprising, a material removal machine comprising a material removal tool, a drive assembly configured to move the material removal tool towards or away from a sample, and control circuitry configured to adjust movement of the material removal machine via the drive assembly based on a parameter of the material removal machine, wherein the parameter comprises one or more of a power parameter, a position parameter, and a thermal parameter.

In some examples, the power parameter comprises a power related to actuation of the material removal tool, the thermal parameter comprises thermal energy produced through actuation of the material removal tool, and the spatial parameter comprises one or more of a position of the material removal tool relative to the sample and a speed of the material removal tool. In some examples, the control circuitry is configured to move the material removal tool in a first mode when the parameter, or a change in the parameter, is below a threshold, and in a second mode when the parameter, or a change in the parameter, is above the threshold. In some examples, the control circuitry is configured to move the material removal tool at a first speed in the first mode, and at a second speed in the second mode. In some examples, the second speed is faster than the first speed. In some examples, the second speed is slower than the first speed. In some examples, the threshold is set by a user or determined by the control circuitry. In some examples, the control circuitry determines the threshold based on one or more properties of the material removal tool.

Some examples of the present disclosure relate to a material removal system, comprising a material removal machine comprising a material removal tool, a drive assembly configured to move the material removal machine along or about an axis, a tool actuator configured to actuate the material removal tool using electric current, a tool actuator controller configured to control the tool actuator, the tool actuator comprising a sensor configured to measure the electric current, and control circuitry configured to move the material removal machine via the drive assembly in a first mode when the electric current, or a change in the electric current, is below a threshold, and in a second mode when the electric current, or a change in the electric current, is above the threshold.

In some examples, the control circuitry is configured to move the material removal tool at a first speed in the first mode, and at a second speed in the second mode. In some examples, the threshold is set by a user via a user interface. In some examples, the control circuitry determines the threshold based on one or more properties of the material removal tool. In some examples, the axis is defined by the drive assembly.

Some examples of the present disclosure relate to a method of moving a material removal machine, the method comprising moving the material removal machine via a drive assembly, the material removal machine comprising a material removal tool, and modifying movement of the material removal machine in response to a change in a parameter of the material removal machine, the parameter comprising one or more of a power parameter, a position parameter, and a thermal parameter.

In some examples, the power parameter comprises a power related to actuation of the material removal tool, the thermal parameter comprises thermal energy produced through actuation of the material removal tool, and the spatial parameter comprises one or more of a position of the material removal machine and a speed of the material removal tool. In some examples, the material removal machine is moved via the drive assembly in a first mode when the parameter is below a threshold, and the material removal machine is moved in a second mode when the parameter is above the threshold. In some examples, the material removal machine is moved at a first speed in the first mode, and at a second speed in the second mode. In some examples, the threshold is set by a user. In some examples, control circuitry determines the threshold based on one or more properties of the material removal machine. In some examples, the material removal machine is moved along or about an axis defined by the drive assembly.

In some material removal systems, the material removal tool (e.g. the saw blade) moves from a non-contact (and/or home) position, to a contact (and/or work) position where contact is made with the item being worked (e.g., a material sample). Once in the contact position, the tool may need to change its movement so as to properly work (e.g., cut, grind, polish, etc.) the sample. For example, the tool may be moved quickly from a non-contact position to a contact position, and slowly after reaching the contact position. Conventional material removal machines have used belt tension as an indicator of whether the tool is in a contact or non-contact position. However, use of belt tension has proved to be ineffective, resulting in a relatively slow response to contact. Using the current drawn by a tool actuator (and/or other power parameters) as an indicator of whether the tool is in a contact or non-contact position has proven to be more precise, effective, and/or responsive. Additionally, integration of power sensors into the controller of the tool actuator has reduced issues of cost, signal delay, noise, etc, that may be associated with using one or more separate power sensors.

Some examples of the present disclosure thus relate to movement control of material removal systems, such as, for example, saws, grinders, polishers, and/or more general material preparation and/or testing machines. In some examples, a material removal system includes a material removal machine that is configured to move along and/or about one or more axes at the urging of one or more actuators. The material removal machine includes a material removal tool configured to spin on a spindle at the urging of a tool actuator. The tool actuator draws electrical current from a power source. Control circuitry is configured to control movement (e.g., speed, acceleration, direction, etc.) of the material removal assembly (e.g., via the actuators) based on the current drawn by the tool actuator (and/or other related power parameters).

In operation, the current drawn by the tool actuator (and/or other related power parameters) tends to be less when the tool is in a non-contact position (where there is no drag and/or friction from the sample that must be overcome) than when the tool is in a contact position (where there is drag and/or friction from the sample that must be overcome). The additional current used when in the contact position is used to generate a greater force (and/or torque) with which to spin the tool, so as to overcome the opposing frictional (and/or drag) force of the material sample. Disclosed examples monitor the current drawn (and/or changes in the current drawn) by the tool actuator and control movement of the material removal assembly based on the current.

FIG. 1 shows a simplified illustration of an example material removal system 100. As shown, the material removal system 100 includes a material removal assembly 200 and a table 102 substantially enclosed within a cabinet 104 (and/or housing). The table 102 is configured to retain a material sample (not shown), upon which the material removal assembly 200 may operate. In the example of FIG. 1, the material removal assembly 200 further includes a user interface (UI) 106, control circuitry 700, and a power source 108. While shown outside of the cabinet in FIG. 1, in some examples, the UI 106, control circuitry 700, and/or power source 108 may be positioned within the cabinet 104.

In some examples, the UI 106 may comprise user accessible inputs and/or outputs. For example, the UI 106 may comprise one or more visual outputs (e.g., touch display screens, video monitors, light emitting diodes, incandescent lights, and/or other lights, etc.) and/or one or more audio outputs (e.g., audio speakers). In some examples, the UI 106 may further comprise one or more visual inputs (e.g., touch display screens, buttons, knobs, switches, etc.) and/or one or more audio inputs (e.g., microphones). In some examples, the UI 106 may further comprise one or more input and/or output ports and/or devices (e.g., universal serial bus (USB) ports, audio ports, HDMI ports, network ports, disc drives, compact disc drives, digital video disc drives, etc.). In some examples, the UI 106 may further include one or more wireless communication devices (e.g., short range communication devices, radio devices, wireless network devices, etc.) configured to enable wireless communication between a third party device and the user interface 106.

Figure 2A:
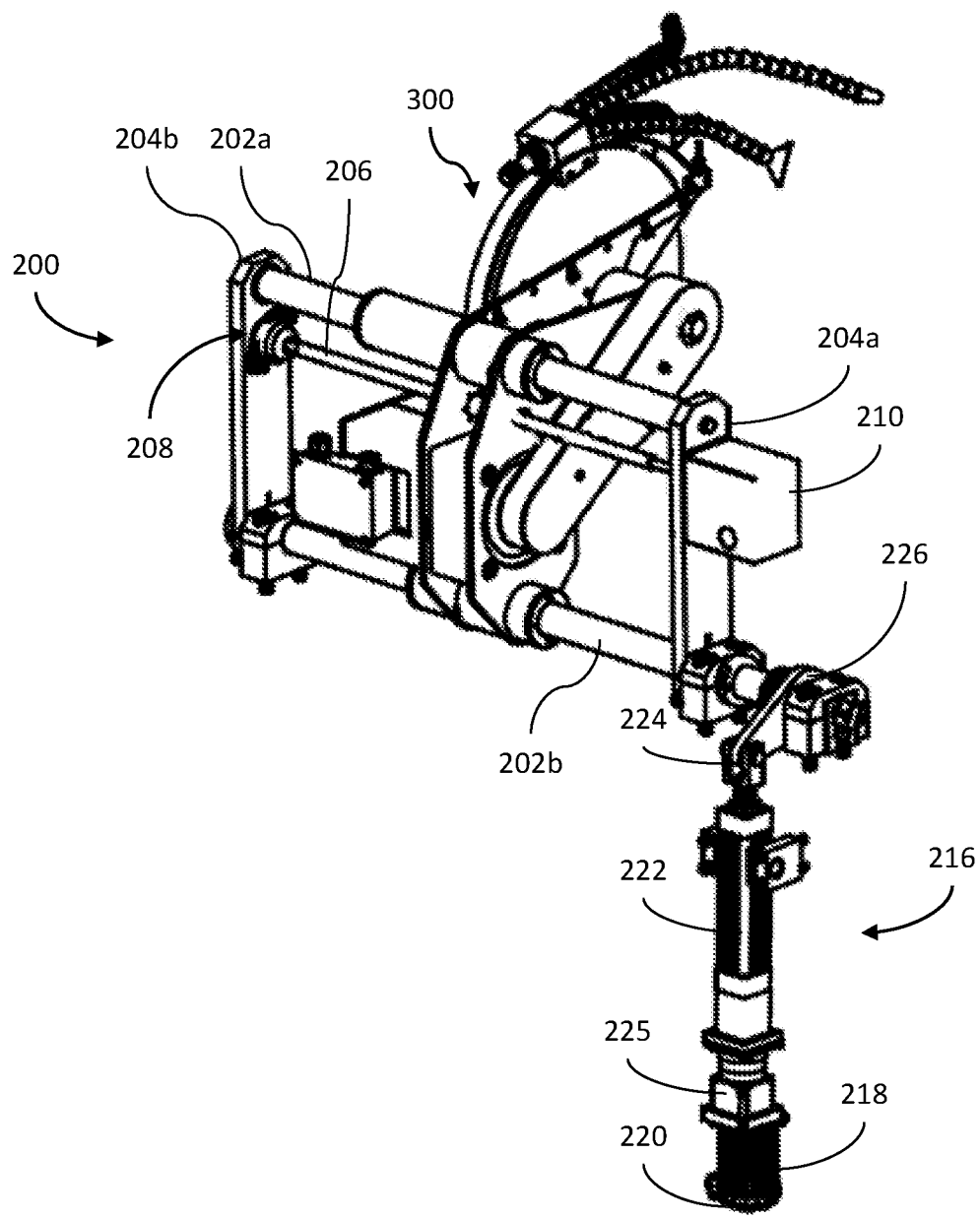
FIG. 2*a* is a rear perspective view of an example material removal assembly of the material removal system of FIG. 1, in accordance with aspects of this disclosure.
Figure 2B:
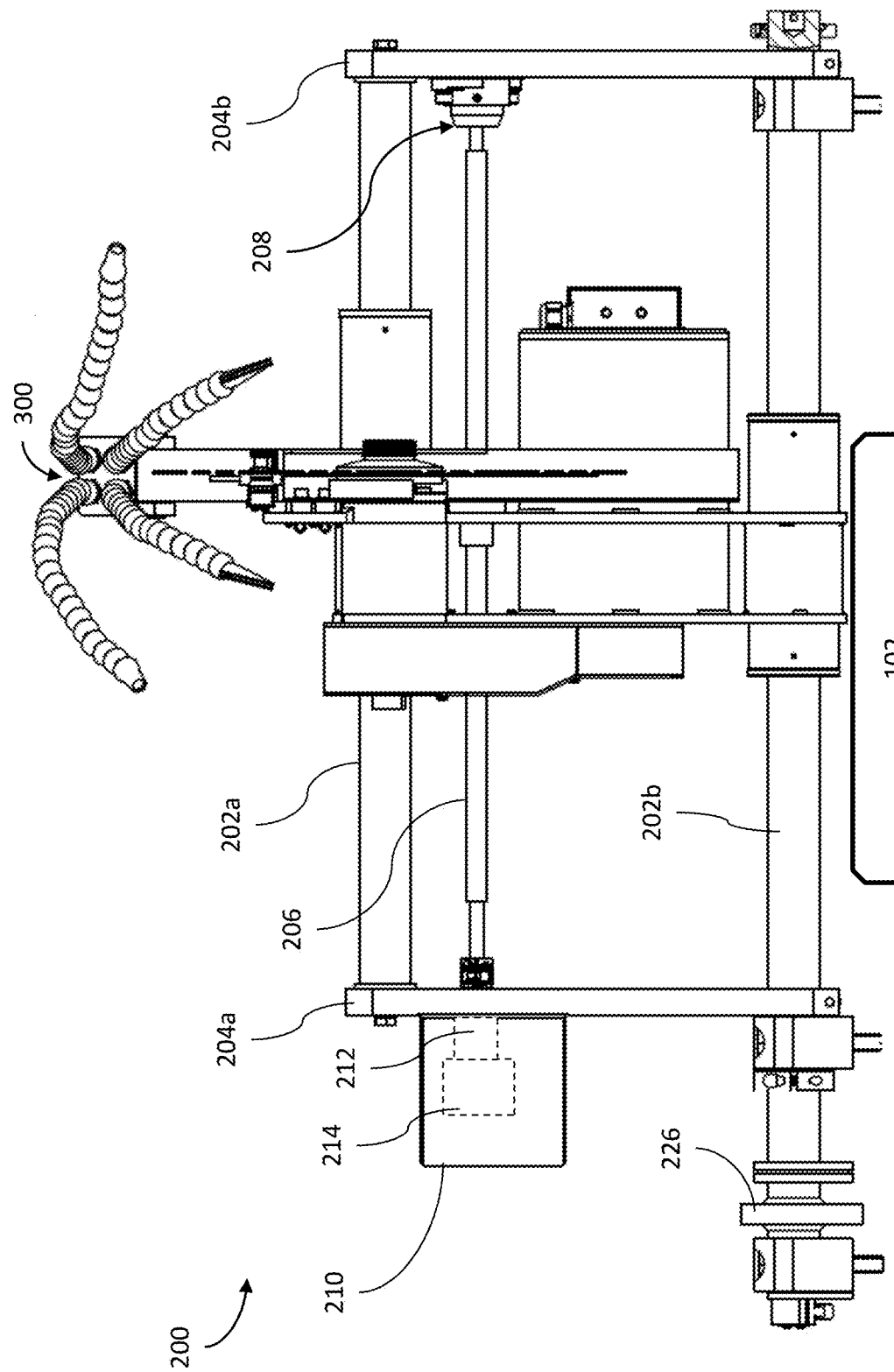
FIG. 2*b* is a front view of the example material removal assembly of FIG. 2*a*, along with a table, in accordance with aspects of this disclosure.

FIGS. 2a and 2b show a rear perspective view and a front view, respectively, of the example material removal assembly 200. As shown, the material removal assembly 200 includes a material removal machine 300 retained on an upper support rail 202a and a lower support rail 202b between a first end plate 204a and a second end plate 204b. In the example of FIG. 2b, the table 102 is also positioned between the first end plate 204a and the second end plate 204b. The support rails 202 extend through the material removal machine 300 and are retained by the end plates 204. More particularly, the support rails 202 extend through sleeves 308 of the material removal machine, as shown, for example, in FIG. 3a.

In the example of FIGS. 2a and 2b, an actuation shaft 206 extends between the end plates 204 and through the material removal machine 300. More particularly, the actuation shaft 206 extends through a nut 302 of the material removal machine 300 (see, e.g., FIG. 3b). The actuation shaft 206 may include engagement features, such as screw threads, for example. The engagement features may engage with complementary engagement features (e.g., threaded grooves) of the nut 32 of the material removal machine 300. As shown, the actuation shaft 206 is positioned vertically between the support rails 202 and rotatably attached to the second end plate 204b. More particularly, the actuation shaft 206 is attached to the second end plate 204b at a bearing 208. The bearing 208 is configured to retain an end of the actuation shaft 206 to the second end plate 204b, while allowing the actuation shaft 206 to rotate within the bearing 208. The other end of the actuation shaft 206 is rotatably attached to the first end plate 204a.

In the example of FIGS. 2a and 2b, an actuation housing 210 is also attached to the first end plate 204 proximate to the attachment point of the actuation shaft 206. Within the actuation housing 210 is a shaft actuator 212 (e.g., a motor) in mechanical communication with the actuation shaft 206. As shown, the shaft actuator 212 is in electrical communication with a shaft actuator controller 214. The shaft actuator 212 is configured to turn the actuation shaft 206 in response to input (e.g., one or more control signals) from the shaft actuator controller 212. When turned, the engagement features of the actuation shaft 206 engage with the complementary engagement features of the nut 302 to move (e.g., push and/or pull) the material removal machine 300 along the support rails 202 towards and/or away from the first end plate 204a, second end plate 204b, and/or table 102. As such, the support rails 202 define an axis along which the material removal machine 300 is configured to move linearly. In some examples, the shaft actuator 212 and/or shaft actuator controller 212 may be otherwise positioned.

In the example of FIG. 2a, the material removal assembly 200 further includes a rail actuator unit 216 configured to turn the lower support rail 202. As shown, the rail actuator unit 216 comprises a rail actuator 218 (e.g., a servo motor and/or other motor) and a rail actuator controller 220. The rail actuator 218 is configured to turn the lower support rail 202 in response to input (e.g., one or more control signals) from the rail actuator controller 220.

In the example of FIG. 2a, the rail actuator unit 216 is a linear actuator. More particularly, the rail actuator 218 of the rail actuator unit 216 is in mechanical communication with an actuation rod 222 through a gearbox 225, such that the gearbox 225 translates actuation of the rail actuator 218 into linear (and/or linearly reciprocating) movement of the actuation rod 222. An end of the actuation rod 222 is attached to a coupler 224 that is coupled to an armature 226 of the lower support rail 202b. The coupler 224 and/or armature 226 translate linear movement of the actuation rod 222 into rotational movement of the lower support rail 202b. When the lower support rail 202b is turned, the lower support rail 202b moves the end plates 204 about the lower support rail 202b. The end plates 204, in turn, move the upper guide rail 202a and the actuation shaft 206 about the lower support rail 202b. The movement of the upper guide rail 202a forces the material removal machine 300 to also move about the lower support rail 202b. Thus, rotation of the lower support rail 202b causes rotation of the material removal machine 300 about an axis defined by the lower support rail 202b.

Figure 3A:
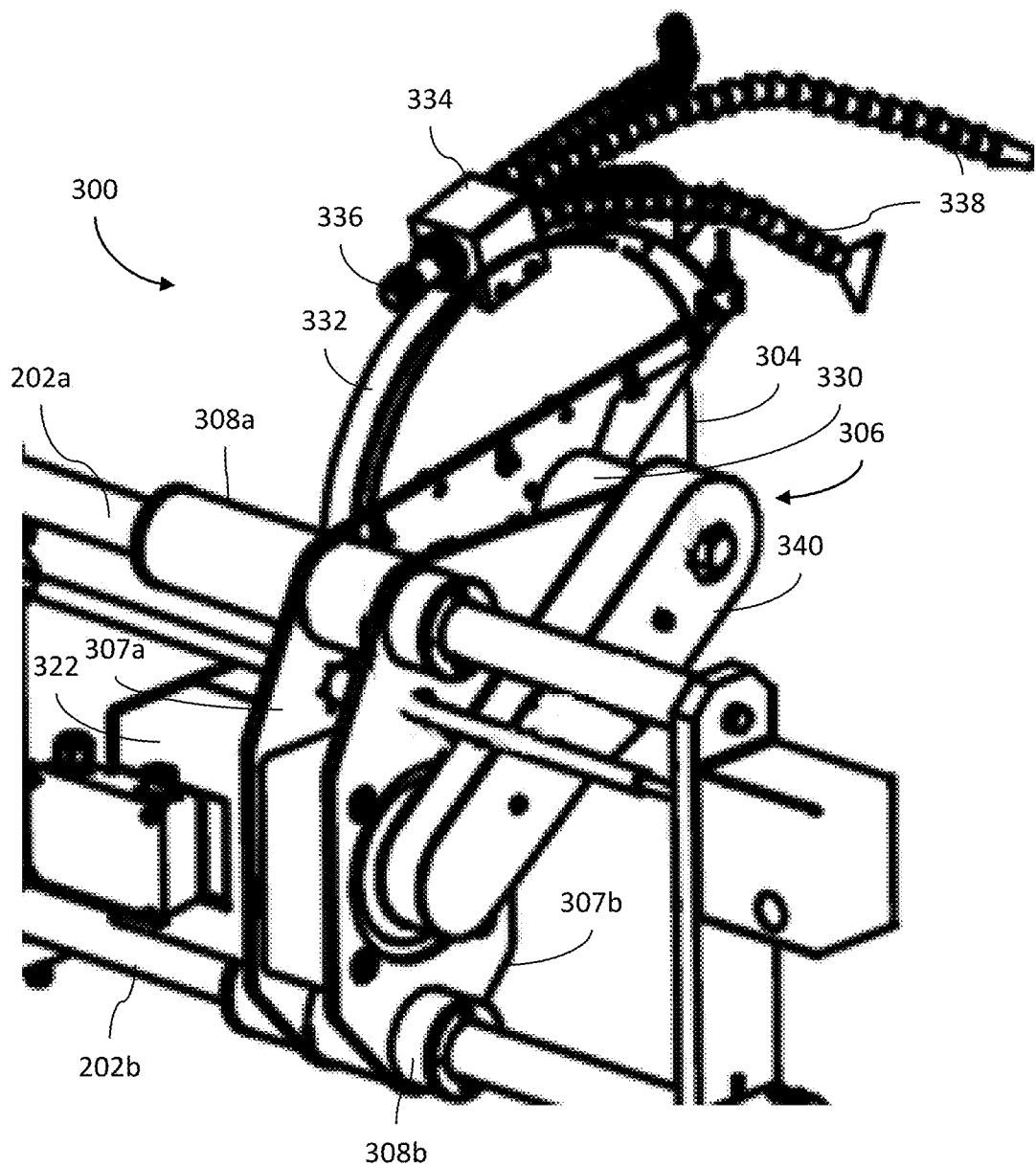
FIG. 3*a* is an enlarged rear perspective view of an example material removal machine of the material removal assembly of FIG. 2*a*, in accordance with aspects of this disclosure.
Figure 3B:
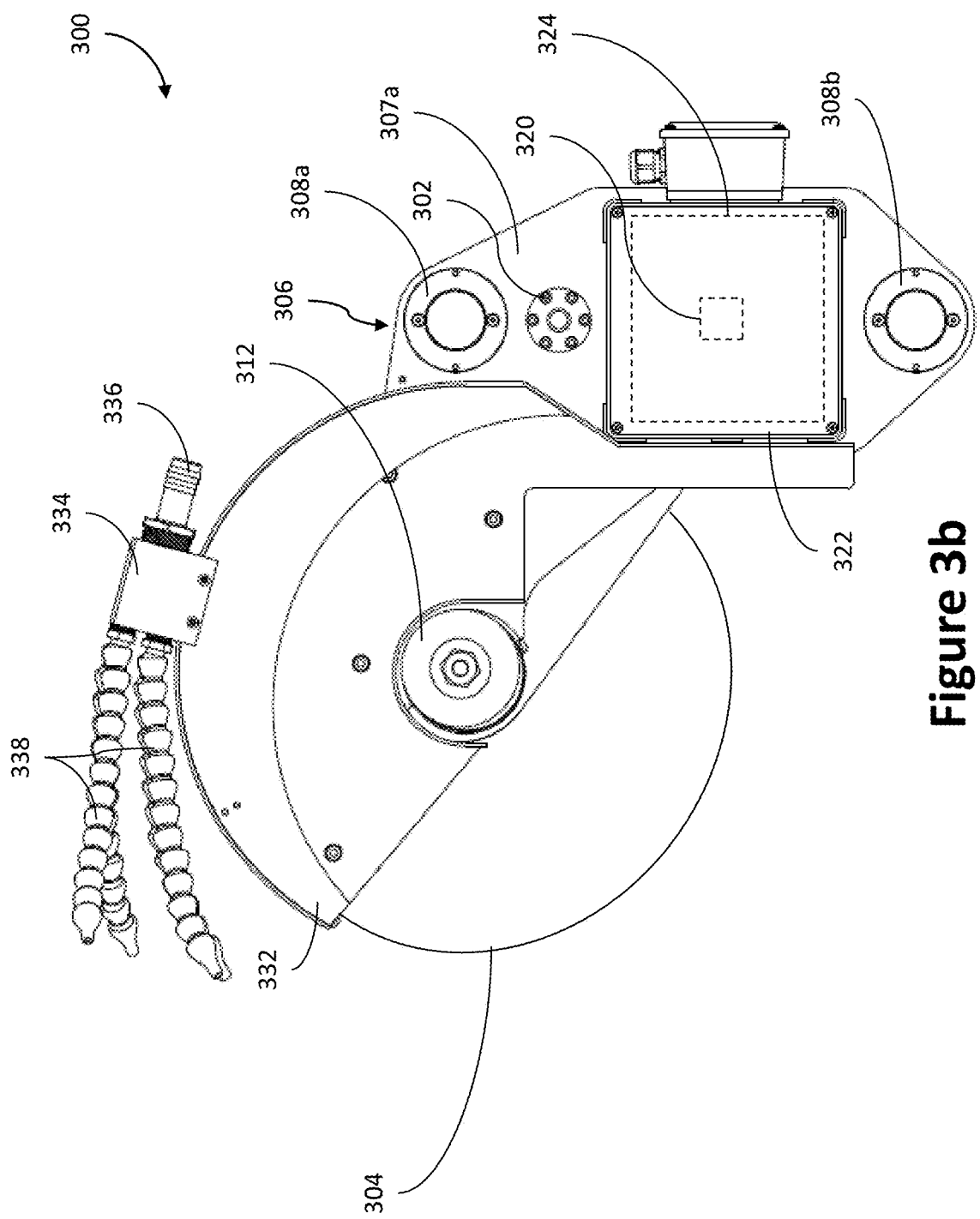
FIG. 3*b* is a side view of an example material removal machine of the material removal assembly of FIG. 2, in accordance with aspects of this disclosure.
Figure 3C:
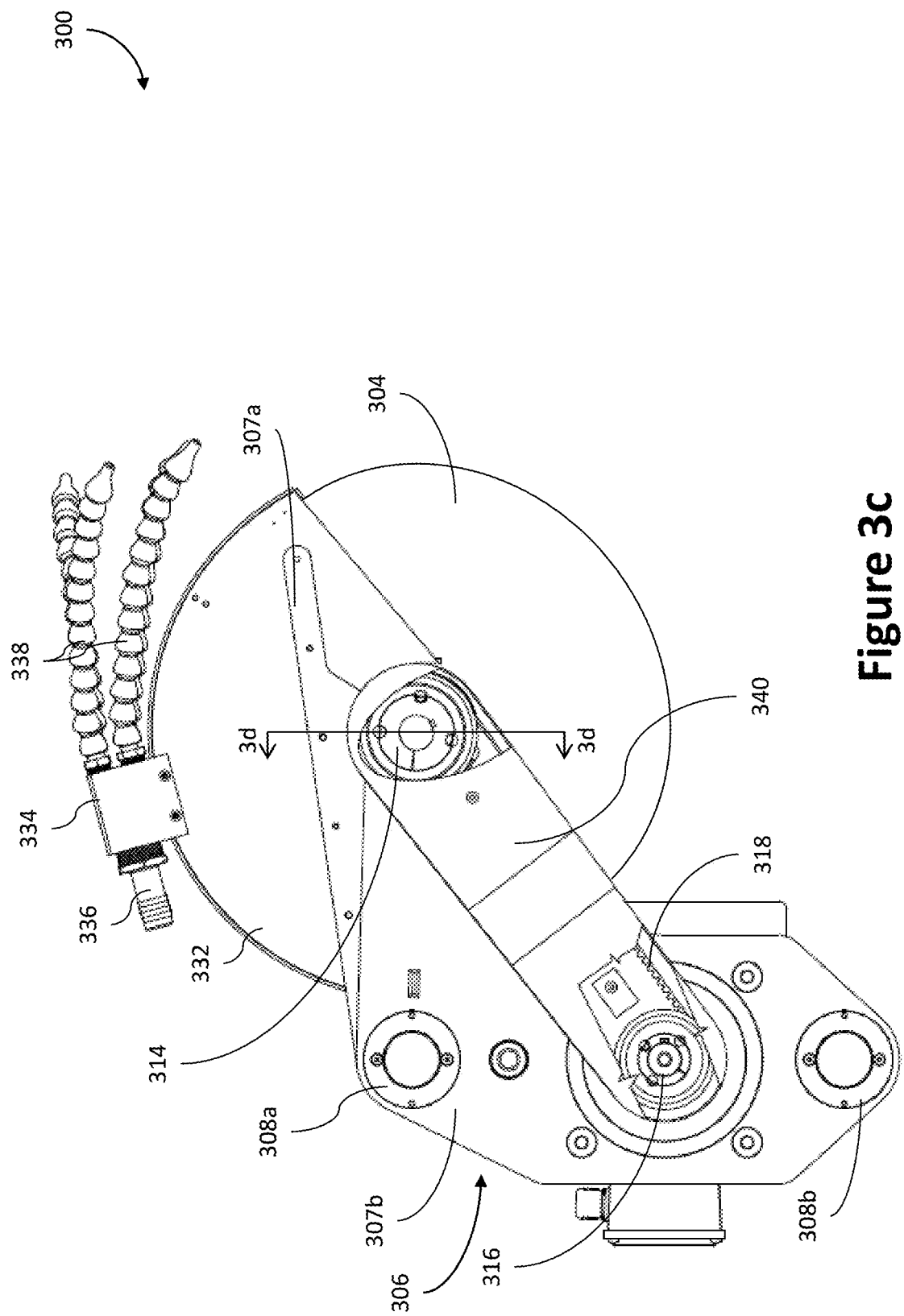
FIG. 3*c* is an opposite side view of the example material removal machine of FIG. 3*b*, in accordance with aspects of this disclosure.
Figure 3D:
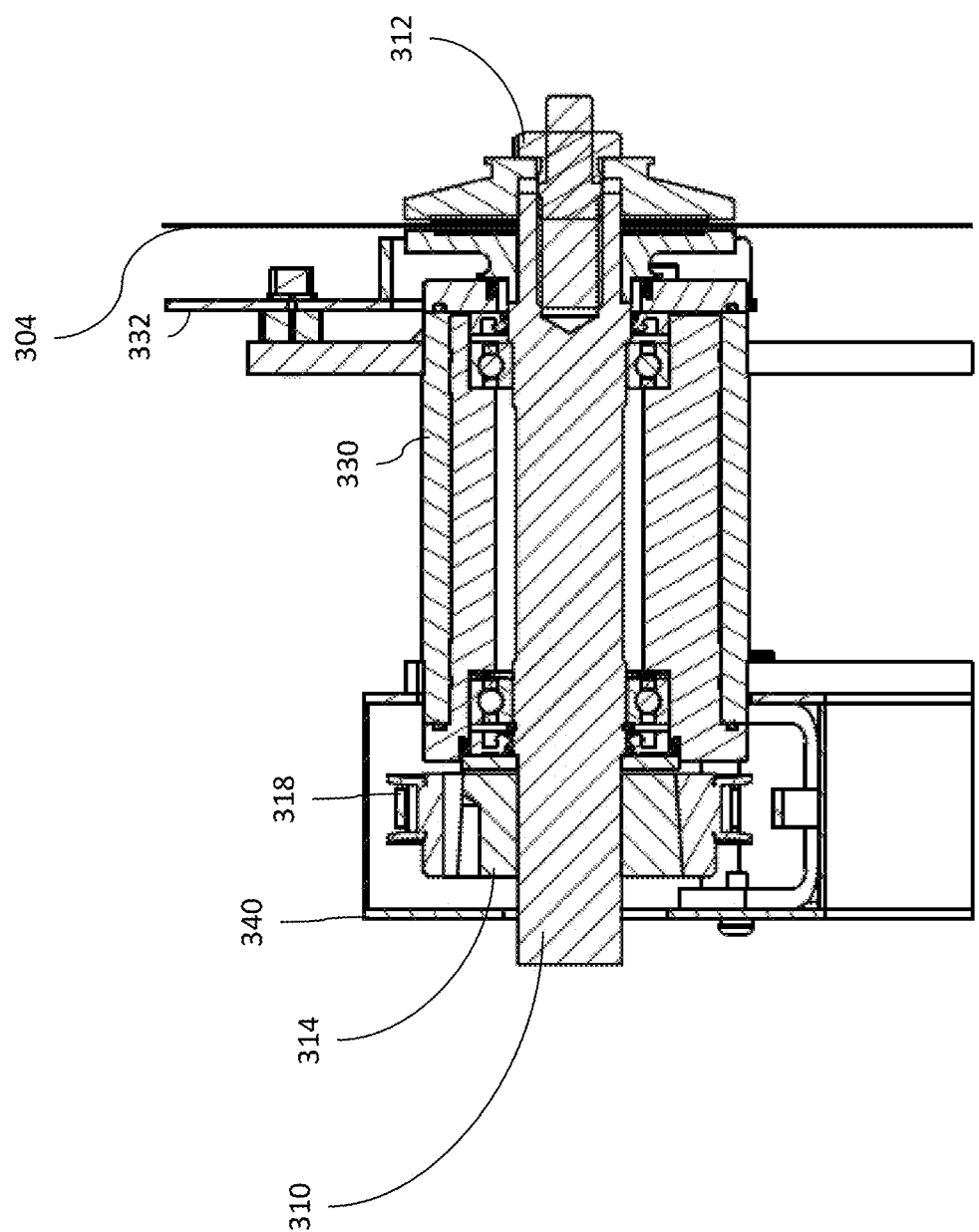
FIG. 3*d* is a cross section view of a portion of the example material removal machine of FIG. 3*a*, along the line 3*d*-3*d* in FIG. 3*c*, in accordance with aspects of this disclosure.
Figure 6:
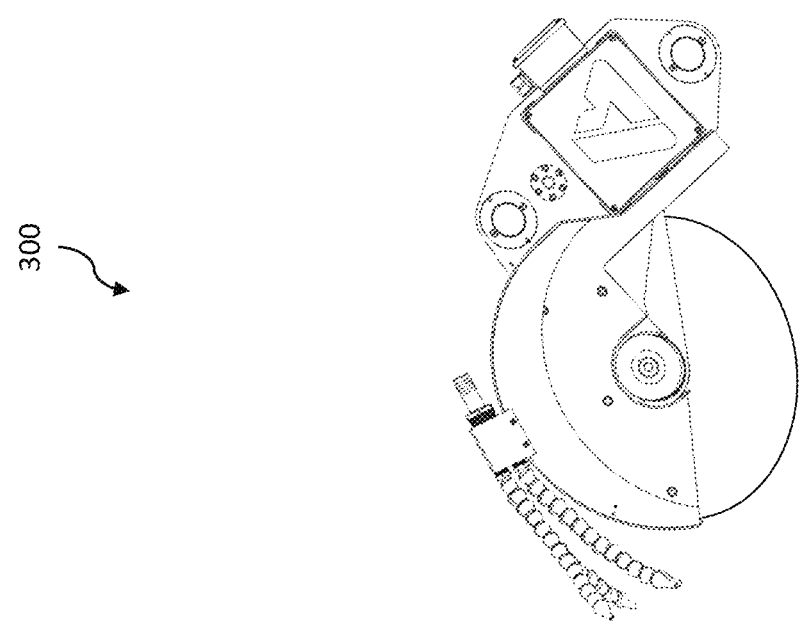
FIGS. 4-6 illustrate rotational movement of the material removal machine of FIG. 3, in accordance with aspects of this disclosure.
Figure 5:
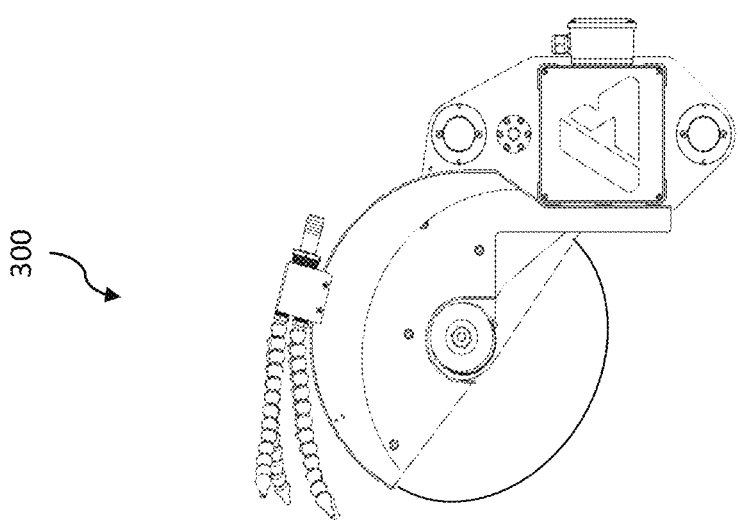
Figure 4:
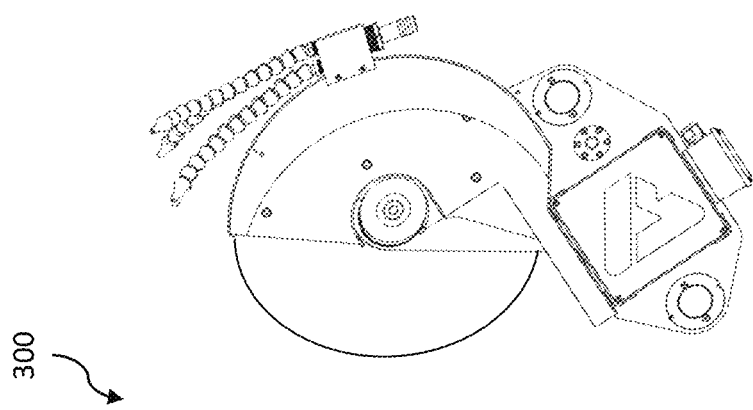

FIGS. 4-6 illustrate example rotational movement of the material removal machine 300 via the rail actuator 218 from a side view of the material removal machine 300. In the example of FIG. 4, the material removal machine 300 is in a retracted position, rotated rearward. In some examples, the rotational position of the material removal machine 300 in FIG. 4 might be a non-contact position. In the example of FIG. 5, the material removal machine 300 has been rotated forward somewhat, to a position such as was shown in FIGS. 3a-3c. In some examples, the rotational position of the material removal machine 300 in FIG. 4 might be a home and/or non-contact position, depending on the size of the sample and/or linear alignment of the material removal machine 300 with the sample. In the example of FIG. 6, the material removal machine 300 has been rotated even farther forward. In some examples, the rotational position of the material removal machine 300 in FIG. 6 might be a sample contact position, depending on the size of the sample and/or linear alignment of the material removal machine 300 with the sample.

FIGS. 3a-3c show various views of the material removal machine 300. FIG. 3a is an enlarged rear perspective view, while FIGS. 3b and 3c show side views of the material removal machine 300, with some of the other elements of the material removal assembly 200 removed for the sake of clarity. As shown, the material removal machine 300 includes a material removal tool 304 (e.g., a saw blade, abrasive saw, grinder, polisher, etc.) coupled to a support 306.

In the examples of FIGS. 3a-3d, the support 306 includes two substantially parallel support plates: a first support plate 307a and a second support plate 307b. The support plates 307 are connected through the sleeves 308 (upper sleeve 308a and lower sleeve 308b), a spindle housing 330, and a tool actuator housing 322. The tool actuator housing 322 encloses a tool actuator 320 and/or tool actuator controller 324, as further discussed below. The spindle housing 330 encloses at least a portion of a spindle 310, upon which the material removal tool 300 is secured. The sleeves 308 are attached to and/or extend through the support plates 307. The sleeves 308 further encircle portions of the support rails 202. This allows the sleeves 308 to guide the material removal machine 300 along the support rails 202 when the actuator shaft 206 moves the material removal machine linearly, and further retains the material removal machine 300 on the support rails when the support rails 202 are moved rotatably.

In the examples of FIGS. 3a-3d, the material removal machine 300 further includes a shield 332 connected to the support plate 307a. The shield 332 partially encloses (and/or encases) the material removal tool 300. A coolant manifold 334 is attached to an upper portion of the shield 332. As shown, the coolant manifold 334 includes a coolant inlet 336 in fluid communication with several coolant outlets 338. The support plate 307a also includes the nut 302. The material removal tool 304 is coupled to the support 306 via a spindle 310, as shown, for example, in FIG. 3d.

As shown in the example of FIGS. 3-5, the spindle 310 extends through a center (and/or central aperture) of the material removal tool 304. As shown, the spindle 310 is substantially cylindrical and/or encased within an arm 340 of the support and a substantially cylindrical spindle housing 330. The spindle housing 330 extends between and/or attaches to the support plates 307. A fastener 312 that attaches to an end of the spindle 310 secures the material removal tool 304 on the spindle 310. As shown, the fastener 312 is a nut, but in other examples the fastener 312 may be a nut, bolt, screw, nail, and/or any other type of appropriate fastener. In the example of FIG. 5, the spindle 310 also extends through a center (and/or central aperture) of a spindle pulley 314 at the other end of the spindle 310 from the fastener 312. When the spindle pulley 314 turns, the spindle pulley 314 engages (and/or urges, moves, forces, acts on, etc.) the spindle 310 to turn the spindle 310 and the material removal tool 304.

In the example of FIG. 4, an actuator pulley 316 is mechanically connected to the spindle pulley 314 via a belt 318, such that the belt 318 translates rotation of the actuator pulley 316 into rotation of the spindle pulley 314. As shown, the actuator pulley 316 is mechanically connected to a tool actuator 320 (e.g., an electrical motor) configured to turn the actuator pulley. In the example of FIG. 3, the tool actuator 320 is encased in a tool actuator housing 322 of the support 306. As shown, a tool actuator controller 324 is also encased within the actuator housing 322. In some examples, the tool actuator 320 and/or tool actuator controller 324 may be otherwise positioned. The tool actuator controller 324 is in electrical communication with the tool actuator 320. The tool actuator 320 is configured to turn the actuator pulley 316 in response to input (e.g., one or more control signals) from the tool actuator controller 324. When turned, the belt 318 translates rotation of the actuator pulley 316 into rotation of the spindle pulley 314, and the spindle 310 translates rotation of the spindle pulley 314 into rotation of the material removal tool 304.

Figure 7:
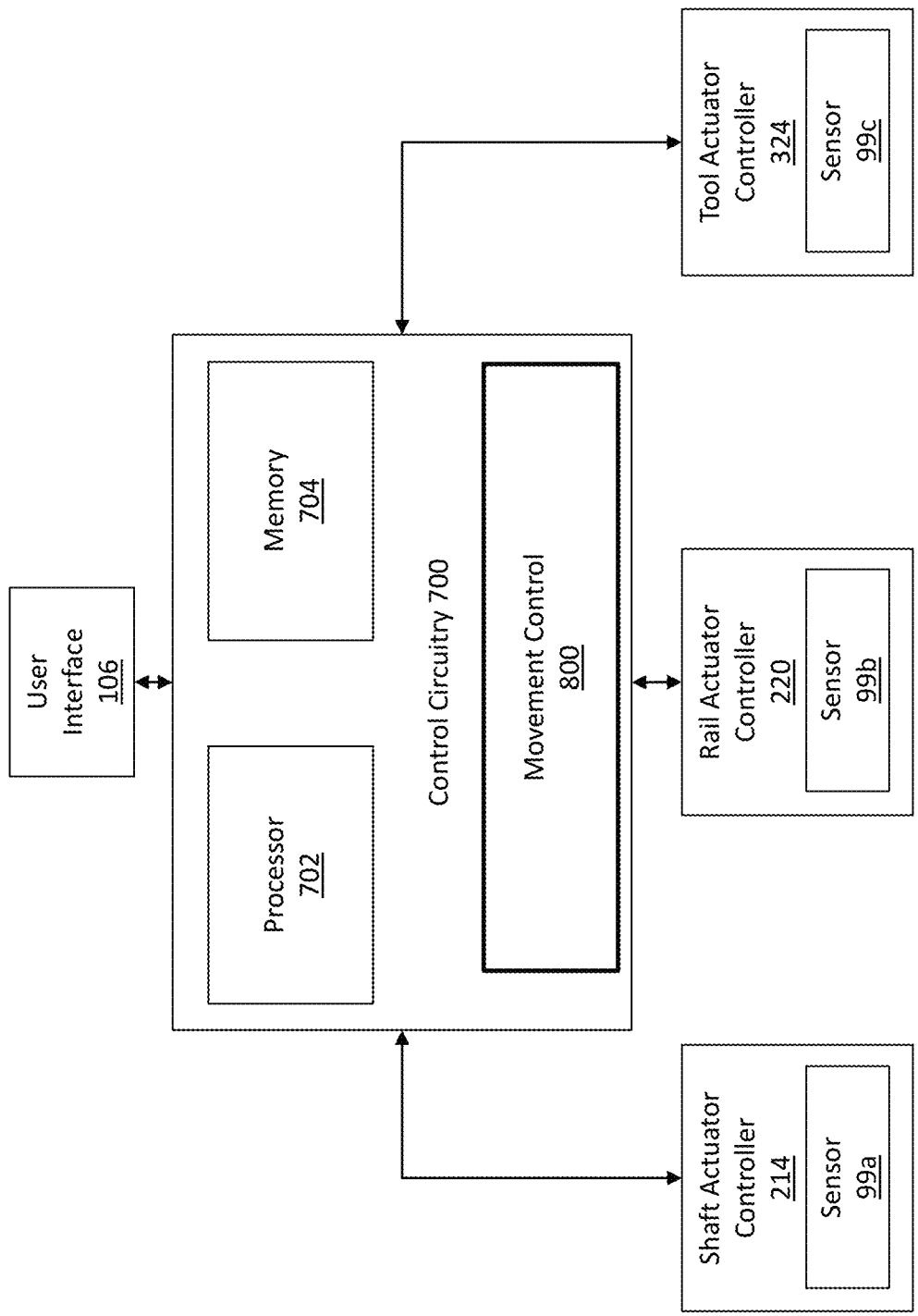
FIG. 7 is a block diagram of control circuitry of the example material removal system of FIG. 1, in accordance with aspects of this disclosure.

FIG. 7 is a block diagram showing the control circuitry 700 of the material removal assembly 200 of FIGS. 1 and 2. In the example of FIG. 7, the control circuitry 700 includes one or more processors 702 and memory 704. The one or more processors 702 may use data stored in the memory to execute control algorithms (and/or functions, processes, operations, routines, etc.). The data stored in memory 704 may be received via the UI 106 and/or be preloaded.

In the example of FIG. 7, the control circuitry 700 is connected to (and/or in electrical communication with) the UI 106, the shaft actuator controller 214, the rail actuator controller 220, and the tool actuator controller 324. The control circuitry 700 is configured to receive one or more input signals from the UI 106, the shaft actuator controller 214, the rail actuator controller 220, and/or the tool actuator controller 324. The control circuitry is further configured to output one or more control (and/or command) signals to the UI 106, the shaft actuator controller 214, the rail actuator controller 220, and/or the tool actuator controller 324. In the example of FIG. 7, the shaft actuator controller 214, rail actuator controller 220, and/or tool actuator controller 324 each include a sensor 99 integrated with their respective controller 214, 220, 324 and/or configured to measure (and/or detect, sense, determine, etc.) an amount of power used (and/or drawn, consumed, conducted, etc.) by the shaft actuator 212, rail actuator 218, and/or tool actuator 320, respectively.

In some examples, the sensors 99 may be separate from the shaft actuator controller 214, rail actuator controller 220, and/or tool actuator controller 324. In some examples, the sensors 99 may additionally, or alternatively, be configured to measure (and/or detect, sense, determine, etc.) other parameters of their respective controllers 214, 220, 324 and/or associated actuators 212, 218, 320, such as, for example, heat. In some examples, the tool actuator controller sensor 99c may be additionally, or alternatively, be configured to measure (and/or detect, sense, determine, etc.) a rotational speed (and/or acceleration) of the material removal tool 304. In some examples, the control circuitry 700 may also be connected to, be in electrical communication with, receive input signals from, and/or send output signals to the actual shaft actuator 212, rail actuator 218, and/or tool actuator 320. In some examples, the power source 108 may be configured to provide power to the shaft actuator controller 214, rail actuator controller 220, tool actuator controller 324, shaft actuator 212, rail actuator 218, tool actuator 320, control circuitry 700, sensors 99, and/or UI 106. In some examples, the shaft actuator controller 214, rail actuator controller 220, and/or tool actuator controller 324 may include one or more power sources configured to provide power to themselves and/or the shaft actuator 212, rail actuator 218, and/or tool actuator 320, respectively.

In the example of FIG. 7, the control circuitry 700 further includes a movement control procedure 800. In some examples, the movement control procedure 800 may comprise one or more analog and/or discrete circuits. In some examples, the movement control procedure 800 may comprise programmatic instructions stored in memory 704 and/or executed by the one or more processors 702. The control circuitry 700 is configured to execute the movement control procedure 800, such as, for example, when moving the material removal assembly. In some examples, the control circuitry 700 executes the movement control procedure 800 every time the material removal assembly 200 is moved. In some examples, the control circuitry 700 executes the movement control procedure 800 only some of the time the material removal assembly 200 is moved. In some examples, the control circuitry 700 executes the movement control procedure 800 in response to input received through the UI 106. In some examples, the control circuitry 700 executes the movement control procedure 800 in response to some other procedure (and/or routine, function, operation, circuitry, signal, etc.).

Figure 8:
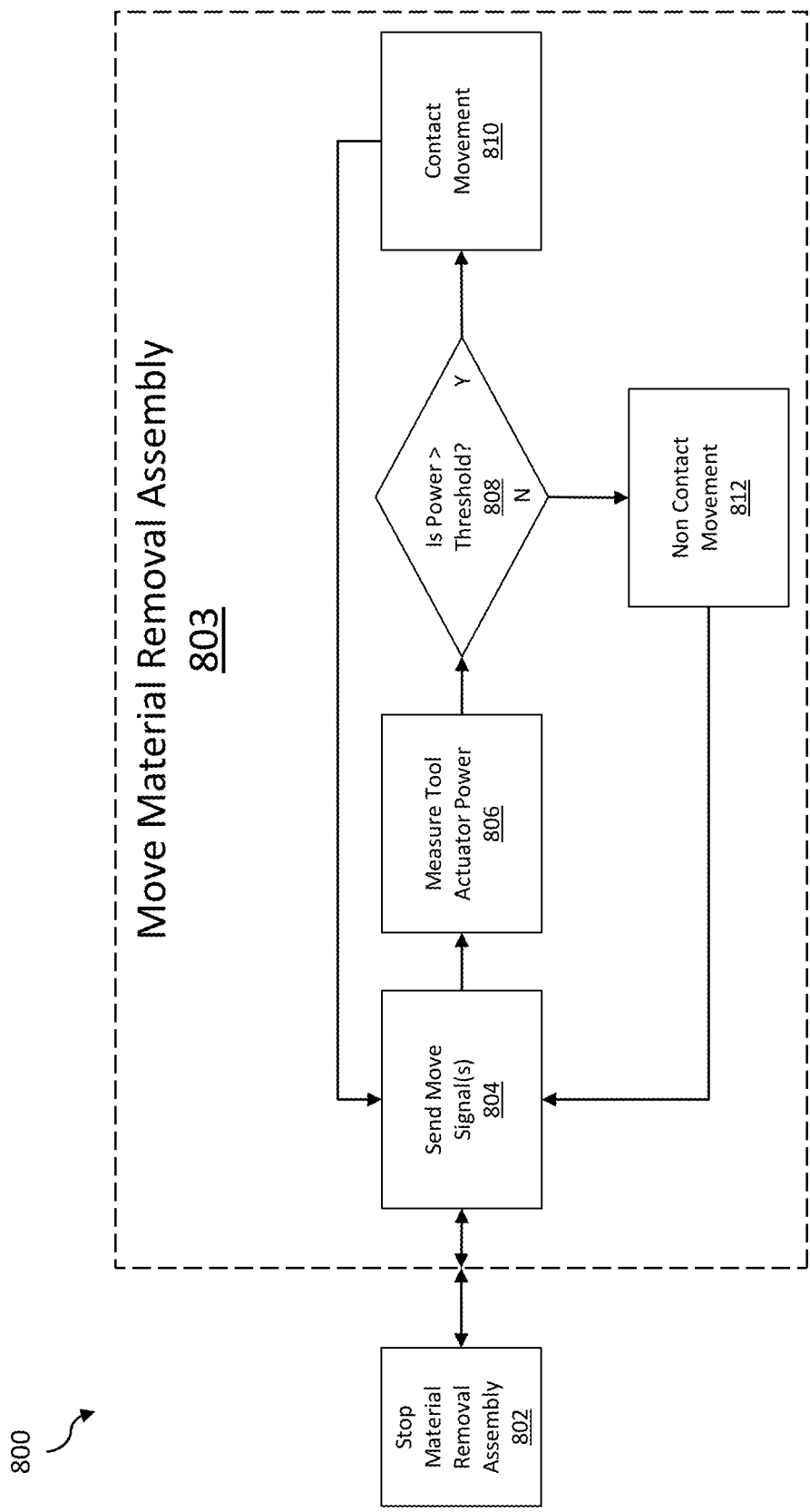
FIG. 8 is a flow diagram of an example touch detection motor control of the control circuitry of FIG. 7, in accordance with aspects of this disclosure.

FIG. 8 is a block diagram illustrating an example of the movement control procedure 800. As shown, the movement control procedure 800 includes a stop material removal assembly block 802 and a move material removal assembly block 803. In some examples, the movement control procedure 800 shifts between the stop block 802 and the move block 803 based on one or more determinations, signals, other control procedures, and/or inputs received via the UI 106.

During the stop block 802, the control circuitry 700 sends one or more stop signals to the shaft actuator controller 214 and/or the rail actuator controller 220 (and/or the shaft actuator 212 and/or rail actuator 218). In response to the stop signals, the shaft actuator controller 214 and/or the rail actuator controller 220 may send one or more of their own corresponding stop signals to the shaft actuator 212 and/or rail actuator 218. In response to the stop signals, the shaft actuator 212 and/or rail actuator 218 may cease any actuation of the material removal assembly 200, thereby stopping movement of the material removal assembly 200 (with the possible exception of movement of the material removal tool 304 via the tool actuator 320). In some examples, the stop block 802 may be considered part of a different procedure rather than the movement control procedure 800.

The move block 803 of the movement control procedure 800 comprises several other blocks. The beginning of the move block 802 is a send move signal(s) block 804. During the send move signal(s) block 804, the control circuitry 700 sends one or more move (and/or actuation) signals to the shaft actuator controller 214 and/or the rail actuator controller 220 (and/or the shaft actuator 212 and/or rail actuator 218). In response to the move signals, the shaft actuator controller 214 and/or the rail actuator controller 220 may send one or more of their own corresponding move signals to the shaft actuator 212 and/or rail actuator 218. In response to the move signals, the shaft actuator 212 and/or rail actuator 218 may commence actuation of the material removal assembly 200, thereby moving the material removal assembly 200 along and/or about the support rails 202.

In some examples, the move signals may be representative of one or more movement parameters (e.g., movement directions, accelerations, speeds, etc.) and/or actuation parameters (e.g., amount of power to use). In some examples, the movement and/or actuation parameters provide instructions to the shaft actuator 212 (and/or shaft actuator controller 214) and/or rail actuator 218 (and/or rail actuator controller 220) as to their movement (and/or actuation, operation, etc.) of the material removal assembly 200. In some examples, the movement and/or actuation parameters may be determined during the remaining blocks of the move block 804. More particularly, in some examples, the remaining blocks of the move block 804 determine whether the movement and/or actuation parameters should be contact or non-contact movement and/or actuation parameters.

Following (and/or concurrent with) the send move signal (s) block 804, the movement control procedure 800 measures the power drawn by the tool actuator 320 at block 806. More particularly, during block 806, the control circuitry 700 receives one or more signals from the tool actuator controller 324 (and/or tool actuator 320) representative of an amount (and/or magnitude) of current being used (and/or drawn, consumed, conducted, etc.) by the tool actuator 320. In some examples, during block 806, the control circuitry 700 receives one or more signals from the tool actuator controller 324 (and/or tool actuator 320) representative of a different power parameter (e.g., voltage, enthalpy, energy, electromagnetic field, etc.), a thermal parameter, a speed parameter, a position parameter, a proximity parameter, and/or some other system parameter. In some examples, the movement control procedure 800 measures a change in the power drawn by the tool actuator 320 at block 806, such as by measuring a difference in current (and/or other system parameter) being used (and/or drawn, consumed, conducted, etc.) by the tool actuator 320 at different times.

At block 808, the measured current (and/or change in current, other system parameter, and/or change in other system parameter) is compared to a threshold current (and/or threshold change in current, other system parameter threshold, and/or change in other system parameter threshold). The threshold may be preloaded (and/or predetermined, preprogrammed, etc.), programmatically determined (e.g., by the control circuitry 700), and/or inputted through the UI 106. For example, the control circuitry 700 may determine the threshold value based on one or more detected, user input, and/or otherwise determined variables (e.g., an actual spinning and/or surface speed of the material removal tool 304, a target spinning and/or surface speed of the material removal tool 304, a radius and/or diameter of the material removal tool 304, a thickness of the material removal tool 304, a weight and/or mass of the material removal tool 304, a sample size, a sample mass, a sample weight, a table size, etc.).

If the measured current (and/or change in current, other system parameter, and/or change in other system parameter) is above the threshold, the movement and/or actuation parameters are set to be contact movement and/or actuation parameters at block 810. If the measured current (and/or change in current, other system parameter, and/or change in other system parameter) is below the threshold, the movement and/or actuation parameters are set to be non-contact movement and/or actuation parameters at block 812. In some examples, if the measured current (and/or change in current, other system parameter, and/or change in other system parameter) is equal to the threshold, the movement and/or actuation parameters are set to be contact movement and/or actuation parameters at block 810. In some examples, if the measured current (and/or change in current, other system parameter, and/or change in other system parameter) is equal to the threshold, the movement and/or actuation parameters are set to be non-contact movement and/or actuation parameters at block 812. In some examples, whether the block 810 or block 812 executes when the measured current (and/or change in current) is equal to the threshold may be determined by input received through the UI 106.

In some examples, the threshold may change based on whether the movement control procedure 800 is currently (and/or was previously) operating using contact or non-contact movement and/or actuation parameters. For example, where the threshold is a change in current threshold, the threshold may be a positive value greater than zero when the movement control procedure 800 is currently (and/or was previously) operating using non-contact movement. In such an example, a threshold slightly above zero would ensure contact movement and/or actuation parameters are used only when there is a positive change (and/or increase) in power (e.g., current) drawn above a certain negligible amount. Likewise, the threshold may be a negative value less than zero when the movement control procedure 800 is currently (and/or was previously) operating using non-contact movement. In such an example, a threshold slightly below zero would ensure non-contact movement and/or actuation parameters are used only when there is a negative change (and/or decrease) in power (e.g., current) drawn below a certain negligible amount. In some examples, the threshold may be approximately zero.

After the movement and/or actuation parameters are set, the movement control procedure 800 returns to block 804 where the procedure 800 repeats. In some examples, the movement control procedure 800 may repeat at a preloaded (and/or pre-stored, pre-programmed, etc.) frequency, a programmatically determined frequency, and/or a frequency input through the UI 106. In some examples, the frequency may be on the order of microseconds and/or milliseconds. The speed with which the procedure 800 repeats, when considered with the speed with which electrical communication is conducted, may result in very quick responsiveness of the material removal assembly 200 to changes in a contact versus non-contact status of the material removal tool 304. In some examples, the contact and/or non-contact movement and/or actuation parameters may be set such that procedure 800 proceeds to the stop block 802 after returning to block 804.

In some examples, the movement control procedure 800 may be part of a larger procedure (and/or operation, function, routine, circuitry, etc.). For example, the material removal assembly 200 may be moved according to some other procedure, and that other procedure may use the movement control procedure 800 for certain portions of the other procedure. For example, the movement control procedure 800 may be used for portions of an operation where the material removal assembly is moved from a home (and/or non-contact) position to a contact position. In some examples, the relevant parameter(s) (e.g., current, voltage, enthalpy, energy, electromagnetic field, heat, speed, position, proximity, etc.) used by the movement control procedure 800 may be programmatically determined, and/or set via the user interface 700.

Figure 9:
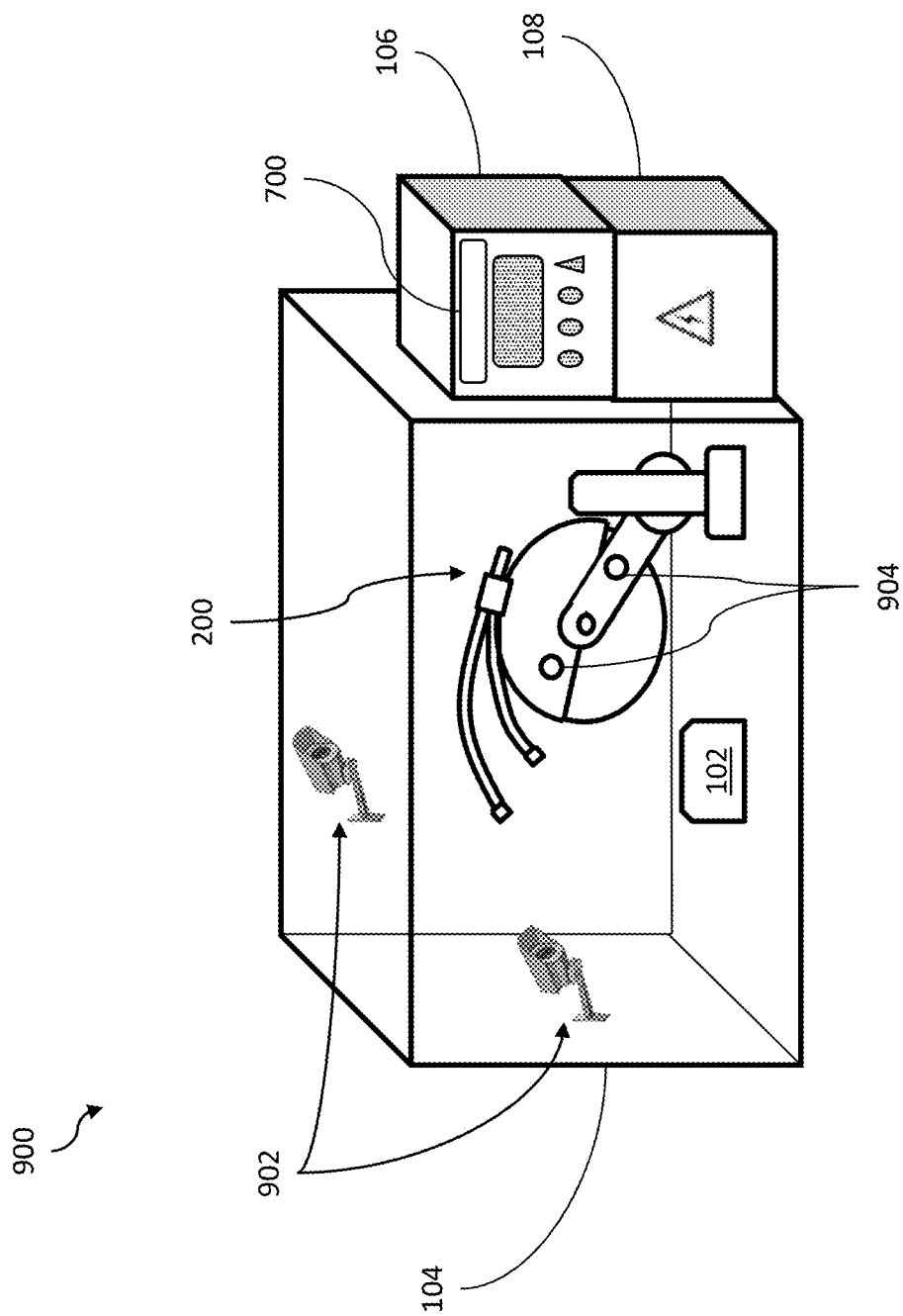
FIG. 9 is a perspective view of another example material removal system, in accordance with aspects of this disclosure.

FIG. 9 shows another example material removal system 900. As shown, the material removal system 900 is similar to the material removal system 100. However, in the example of FIG. 9, the material removal system 900 includes one or more cameras 902 and/or devices 904. The camera 902 and devices 904 may be used with, and/or independent from, one another to detect, sense, and/or measure position and/or proximity of the material removal assembly 200. In some examples, the devices 904 may be sensors, such as proximity sensors, acoustic sensors, thermal sensors, position sensors, and/or other appropriate sensors. In some examples, the devices 904 may be beacons, configured to assist the camera in detecting and/or tracking the material removal machine 200. In some examples, one or more of the cameras 902 may be imaging and/or video cameras, ultraviolet cameras, infrared cameras, microwave cameras, acoustic cameras, laser cameras, and/or some other types of camera. In examples where one or more of the cameras 902 are infrared cameras, one or more of the cameras 902 may distinguish the material removal assembly 200 using the increased temperature of the material removal assembly 200 (e.g., generated by the actuators 212, 218, 320, actuator controllers 214, 220, 324, actuation, movement, and/or work of the material removal tool 304, etc.) relative to the surrounding environment. While the cameras 902 are shown mounted within the cabinet 104, in some examples, the cameras 902 may be mounted outside the cabinet 104, and/or mounted to the material removal machine 200.

In the example of FIGS. 8 and 9, the movement control procedure 800 of the control circuitry 700 may use position and/or proximity (e.g., in relation to the table 102 and/or sample), and/or change in position and/or proximity, to determine whether to use contact or non-contact movement and/or actuation parameters. For example, block 806 of the movement control procedure 800 may measure position and/or proximity (and/or change in position and/or proximity) rather than power. Likewise block 808 may compare the position and/or proximity (and/or change in position and/or proximity) to a threshold in order to determine whether to use contact or non-contact movement and/or actuation parameters in blocks 810, 812.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A material removal system, comprising:
   a material removal machine comprising a material removal tool;
   a drive assembly configured to move the material removal tool towards or away from a sample; and
   control circuitry configured to:
      determine a threshold based on a tool property of the material removal tool, a sample property of a sample to be worked upon by the material removal tool, or a prior movement mode of the material removal tool, and
      move the material removal tool in a first mode when a parameter, or a change in the parameter, is below the threshold, and in a second mode when the parameter, or a change in the parameter, is above the threshold,
      wherein the parameter comprises at least a position parameter, the position parameter comprising a first distance between the material removal tool and the sample, or a second distance between the material removal tool and a mechanism retaining the sample.

2. The system of claim 1, wherein the parameter further comprises a power parameter or a thermal parameter, wherein the power parameter comprises a power related to actuation of the material removal tool, the thermal parameter comprises thermal energy produced through actuation of the material removal tool, or the position parameter comprises a position of the material removal tool relative to the sample or a speed of the material removal tool.

3. The system of claim 2, wherein the control circuitry is configured to move the material removal tool in the first mode when the change in the parameter is below the threshold and in the second mode when the change in the parameter is above the threshold.

4. The system of claim 2, wherein the parameter further comprises the power parameter, and the power parameter comprises a voltage, enthalpy, or electromagnetic field.

5. The system of claim 2, wherein the tool property comprises an actual rotational speed of the material removal tool, a target rotational speed of the material removal tool, a radius of the material removal tool, a diameter of the material removal tool, a thickness of the material removal tool, a weight of the material removal tool, or a mass of the material removal tool, or the sample property comprises a weight of the sample, a mass of the sample, or a size of a device retaining the sample.

6. The system of claim 2, wherein the parameter further comprises a thermal parameter.

7. The system of claim 1, wherein the control circuitry is configured to move the material removal tool, via the drive assembly, at a first speed, at a first acceleration, at a first acceleration, or in a first direction in the first mode, and at a second speed, at a second acceleration, or in a second direction in the second mode.

8. The system of claim 7, wherein the second speed is faster than the first speed.

9. The system of claim 7, wherein the second speed is slower than the first speed.

10. The system of claim 1, wherein the control circuitry is configured to determine the threshold based on the prior movement mode, the prior movement mode comprising the first mode or the second mode.

11. The system of claim 1, wherein the parameter further comprises a thermal parameter, the thermal parameter comprising a thermal output of the material removal system.

12. A material removal system, comprising:
    a material removal machine comprising a material removal tool;
    a drive assembly configured to move the material removal machine along or about an axis;
    a tool actuator configured to actuate the material removal tool using electric current;
    a tool actuator controller configured to control the tool actuator, the tool actuator controller comprising a sensor configured to measure the electric current; and
    control circuitry configured to
       determine a threshold based on a tool property of the material removal tool, the tool property of the material removal tool comprising an actual rotational speed of the material removal tool, a target rotational speed of the material removal tool, a radius of the material removal tool, a diameter of the material removal tool, a thickness of the material removal tool, a weight of the material removal tool, or a mass of the material removal tool, and
       move the material removal machine via the drive assembly in a first mode when the electric current, or a change in the electric current, is below the threshold, and in a second mode when the electric current, or a change in the electric current, is above the threshold.

13. The system of claim 12, wherein the control circuitry is configured to move the material removal tool about the axis, via the drive assembly, at a first speed, at a first acceleration, at a first acceleration, or in a first direction, in the first mode, and at a second speed, at a second acceleration, or in a second direction in the second mode.

14. The system of claim 12, wherein the axis is defined by the drive assembly.

15. The system of claim 12, wherein the control circuitry is further configured to determine the threshold based on a sample property of a sample to be worked upon by the material removal tool, or a prior movement mode of the material removal tool.

16. The system of claim 15, wherein the control circuitry is further configured to determine the threshold based on the sample property of the sample, the sample property comprising a weight of the sample, a mass of the sample, a size of the sample, or a size of a device retaining the sample.

17. The system of claim 15, wherein the control circuitry is further configured to determine the threshold based on the prior movement mode, the prior movement mode comprising the first mode or the second mode.

18. The system of claim 12, wherein the control circuitry is configured to move the material removal tool in the first mode when the change in the current is below the threshold and in the second mode when the change in the current is above the threshold.

19. The system of claim 12, wherein the sensor is integrated with the tool actuator controller.

* * * * *